Patented Feb. 20, 1923.

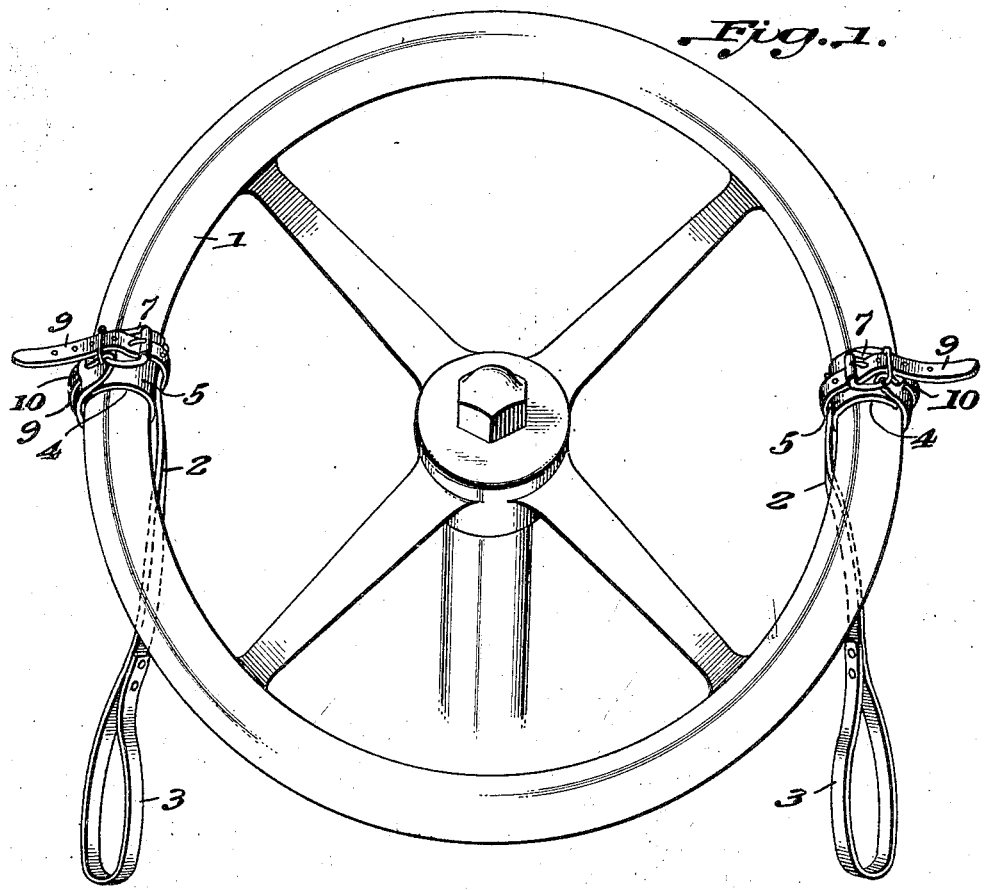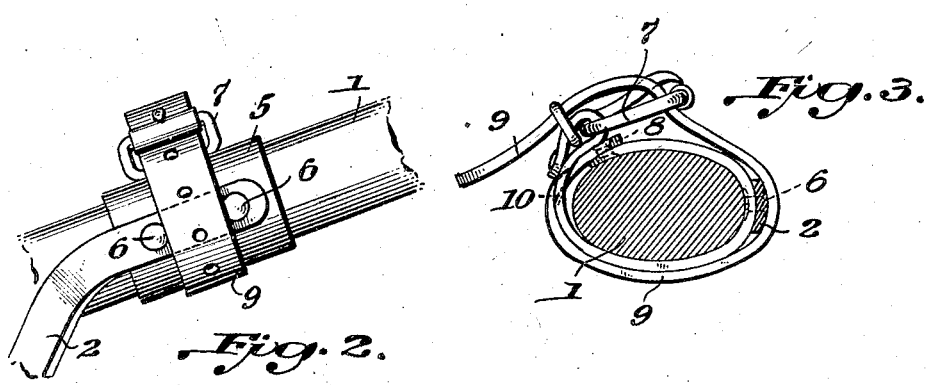

1,446,304

UNITED STATES PATENT OFFICE.

EDWARD W. A. HOLTZ, OF EVANSVILLE, INDIANA.

STEERING-WHEEL ATTACHMENT.

Application filed February 23, 1922. Serial No. 538,576.

*To all whom it may concern:*

Be it known that I, EDWARD W. A. HOLTZ, a citizen of the United States, residing at Evansville, in the county of Vanderburgh and State of Indiana, have invented certain new and useful Improvements in Steering-Wheel Attachments, of which the following is a specification.

This invention relates to that general class of attachments for the steering wheels of automobiles intended to enable the steering wheel to be held or manipulated without actually grasping it with the hands.

The purpose of devices of this general character is to relieve the hands and arms of the driver of the car of strain, from time to time, particularly when driving long distances over country roads or roads which are not much frequented.

The object of my invention is to provide improved flexible attachments which can be readily attached to, or removed from, any steering wheel and will enable the driver to remove his hands from the wheel and allow them to rest comfortably in his lap while enabling adequate steering of the car to be had and permitting instantaneous grasping of the steering wheel by the hands whenever this becomes necessary.

In its broadest aspect my invention comprises a pair of hand-holds, preferably of a flexible nature, attached to the steering wheel at opposite sides thereof, arranged so that they may be held by the hands of the driver when his hands are in his lap and are removed from the steering wheel.

In practice I have found that leather or webbing driving straps are well adapted for this purpose, said straps being provided with means for their attachment for the steering wheel. Preferably these straps have loops to receive the hands or wrists of the driver and are provided with suitable fastening means, such as buckled bands to encircle the steering wheel.

My invention consists, first, in the driving attachment as an article of manufacture adapted to be sold to the user and by him applied to the steering wheel of his automobile; second, in the combination with a steering wheel, of driving connections, preferably flexible, attached to the steering wheel and affording a hold for the hands of the driver.

A practical embodiment of the invention is set forth hereinafter and is shown in the accompanying drawings, in which:

Figure 1 is a plan view of a steering wheel equipped with my attachments.

Fig. 2 is a detail side elevation, certain parts being broken away; and

Fig. 3 is a detail cross section through the steering wheel showing the means for securing the attachment thereto.

An automobile steering wheel is shown at 1. The attachments comprising my invention are designated 2.

My improved attachments 2 are in the form of hand-holds connected to the steering wheel 1 at suitable points on opposite sides thereof and of a suitable length to adapt them to extend from the region of the lap of the driver so that they may be grasped by the driver's hands when the latter are resting upon his lap, thus enabling the steering wheel to be manipulated without the necessity of grasping it with the hands.

Occasion for the use of the attachment 2 arises at times in long distance driving on country roads where the traffic is light and a continued grasp on the steering wheel is unnecessary.

The steering wheel attachments 2 are preferably of flexible, pliable, or yieldable material such as leather or webbing and they are preferably provided with loops 3 to receive the hands of the driver.

The attachments 2 are suitably connected to the steering wheel as at 4.

Except where set forth in the claims, I do not limit the invention to the specific connections of the attachments 2 to the steering wheel but I prefer to use the securing or attaching means shown. The attaching means disclosed in the drawings comprises a binding band 5 which may be of leather or webbing to which the attachments 2 are riveted or otherwise suitably connected at 6. The band is provided with a buckle 7 on one end and to the other end thereof there is attached at 8 a tightening and fastening strap 9 which passes through a slit 10, thence around the band and over the end of the attachment 2 and is held by the buckle 7. The overlapping of the strap on the end of the attachment 2 reinforces the connection therewith to the band to resist the strain exerted at this point. The inside of the band may be roughened, or if leather is used, it may be undressed to afford a better frictional grip on the steering wheel 1.

As the attachments 2 are yieldable, pliable, or flexible, they enable the driver to instantly raise his hands and grasp the steering wheel, when necessary, without even having to resort to slipping of the hands out of the loop 3.

It is not necessary for the buckles to be arranged uppermost as shown in the drawings as I may find it preferable to have the attachments 2 located directly under the steering wheel and, in that event, the buckles would be disposed on the inside of the steering wheel.

I claim:

1. The combination with a steering wheel of a vehicle, of two straps, each adjustably connected at one end to a different part of the steering wheel and each provided with a looped hand-hold on its depending part.

2. A new article of manufacture comprising a steering wheel attachment embodying a flexible, yieldable, or pliable strap having a hand-receiving loop at one end and at its other end being provided with a band having a buckle and a slit, and a fastening strap connected to the band and passing through said slit and around the band and across the joint between the strap and the band and then engaged with the buckle.

In testimony whereof I affix my signature.

EDWARD W. A. HOLTZ.